United States Patent Office 3,681,075
Patented Aug. 1, 1972

3,681,075
PHOTOGRAPHIC MATERIAL COMPRISING ARYL-
ENE POLYAMIDO, POLYCARBOXYLIC ACIDS
Erwin Ranz, Harald von Rintelen, Wolfram Neumann,
and Gerhard Müller, Leverkusen, Germany, assignors
to Agfa-Gevaert Aktiengesellschaft, Leverkusen, Germany
No Drawing. Filed Nov. 2, 1970, Ser. No. 86,278
Claims priority, application Germany, Nov. 6, 1969,
P 19 55 900.3; Dec. 6, 1969, P 19 61 373.1
Int. Cl. G03c 1/72
U.S. Cl. 96—90 R                    1 Claim

ABSTRACT OF THE DISCLOSURE

Light-sensitive arylene polyamido, polycarboxylic acids in photographic layers can be converted to light-sensitive cyclic polyimides which turn dark upon exposure. The conversion is accelerated by isourea derivatives having the formula:

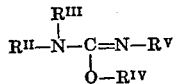

explained below.

---

The invention relates to recording materials which are free from silver halide.

Photographic materials are known which contain as light-sensitive compounds cyclic naphthalene carboxylic acid dimides.

These compounds very rapidly become dark on exposure to light, particularly to UV light, and thus provide a very simple way of obtaining photographic images by a completely dry process.

Furthermore it is known to employ precursors of these cyclic polyimides in the photographic layer, these precursors differing from the cyclic polyimides themselves in being completely insensitive to light but being capable of conversion into the light-sensitive cyclic polyimides by a short and simple treatment such as by heating or by a chemical treatment. The products which are insensitive to light are the corresponding open-chained polyamido polycarboxylic acids. A disadvantage of the open chain compounds is that their conversion into the light-sensitive cyclic polyimides requires a certain amount of time and a high temperature. Thus these compounds are of limited utility.

It is among the objects of the invention to provide methods for accelerating the conversion reaction of the open-chain compounds into the light-sensitive.

We now have found a sheet-like photographic element containing an open-chain arylene polyamido polycarboxylic acid of the formula

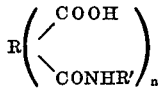

in which

R is a 2 n-valent mononuclear or multinuclear aromatic radical, e.g. a radical of the phenylene, naphthylene or perylene series, preferably naphthylene which may be substituted for example with an alkyl radical, especially an alkyl radical having up to 5 C-atoms, such as methyl, ethyl or propyl, or with a halogen atom such as chlorine or bromine or with a nitrile or alkoxy radical, especially alkoxy having up to 5 C-atoms, and the like;
R' is an olefinically unsaturated linear or cyclic aliphatic radical in particular (1) an unsaturated aliphatic radical having up to 8 C-atoms, e.g. allyl, butenyl or pentenyl, or (2) an unsaturated cycloaliphatic radical such as cyclohexenyl or cyclopentenyl or dicyclopentenyl or the like, which radicals may be directly or through an alkylene bridge having preferably up to 3 C-atoms linked to the nitrogen atom or (3) a 5- or 6-membered ring containing a cyclopropane grouping having preferably an endomethylene structure such as a ring selected from the tricyclene series and
n represents 2 or 3, preferably 2, and which in addition contains an isourea derivative of the following formula:

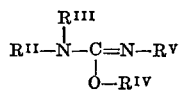

in which $R^{II}$ is an alkyl group, preferably containing up to 5 carbon atoms, a cycloalkyl group, e.g. cyclopentyl and cyclohexyl, or an aryl group, especially a radical of the phenyl series;
$R^{III}$ stands for hydrogen or one of the groups given for $R^{II}$;
$R^{IV}$ represents alkyl containing up to 5 carbon atoms, particularly methyl or ethyl and
$R^{V}=R^{II}$.

The compounds for use according to the invention are prepared by methods known from the literature. The preparation of some of the compounds has been described, for example in U.S. Pat. Nos. 2,906,749 and 3,280,190.

The following isourea derivatives have proved to be especially suitable:

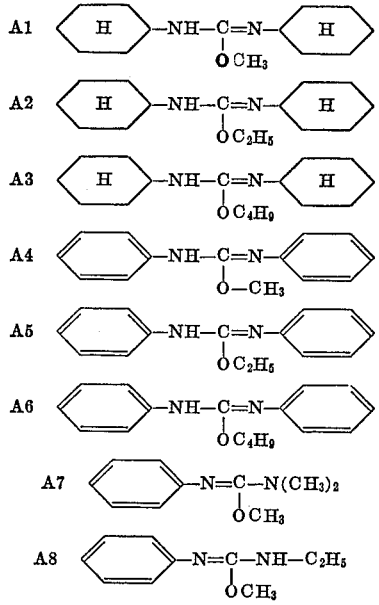

The light-insensitive arylene polyamidopolycarboxylic acids which are to be used in combination with the isourea derivatives as precursors for the light-sensitive cyclic aryl polyimides can be prepared for example as described in U.S. Patent No. 3,533,798 by reacting cyclic aryl polycarboxylic acid anhydrides with amines according to the following equation:

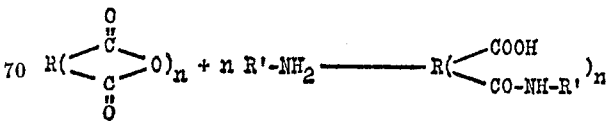

Suitable compounds are, for example those described in U.S. Pat. No. 3,533,798, in some cases in the form of the cyclic light-sensitive product:

B1 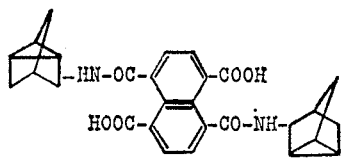

B2 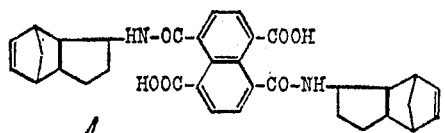

B3 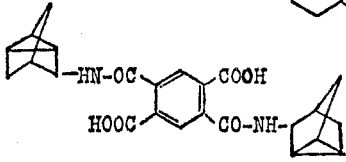

B4 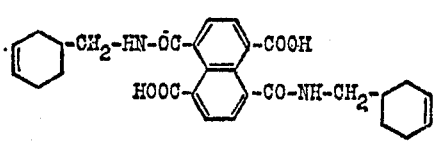

B5 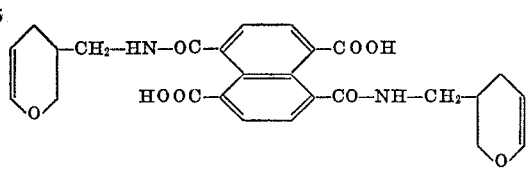

B6

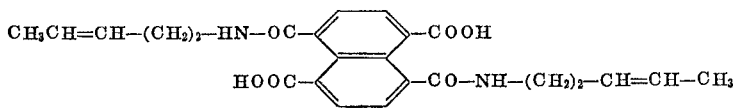

The light-insensitive open-chain precursors are converted into the light-sensitive cyclic compounds by the process described in U.S. Pat. No. 3,533,798 involving brief heating to a temperature of between 100 and 250° C. or a chemical treatment.

The light-sensitive compounds have the formula:

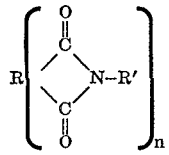

wherein R, R' and $n$ have the meaning defined above.

With this method, relatively high temperatures of up to about 250° C. are required; if lower temperatures are employed, relatively long reaction times of several minutes are necessary.

By addition of the isourea derivatives to these layers, cyclisation of the open chain light-insensitive products into light-sensitive cyclic polyimides takes place within a short time (about 1 to 2 minutes) at temperatures of only about 80° C. or more.

The isourea derivatives may be added to the layers during preparation of the layers or they may be introduced subsequently by bathing the layer in a solution of the isourea derivative. The concentration of the isourea derivatives in the layer may vary within wide limits. Quantities of between 300 mg. and 6 g./m.$^2$ of layer have generally been found sufficient.

The concentration in the layer of the light-insensitive open chain precursors for the preparation of the light-sensitive cyclic polyimides may also vary within wide limits. For most purposes, quantities of between 250 mg. and 3 g./m.$^2$ of layer have been found sufficient. Quantities of between 800 and 1500 mg./m.$^2$ of layer are preferably used.

The layers according to the invention are prepared in the usual manner. Most simply, the light-insensitive arylene polyaminopolycarboxylic acids are dissolved in a suitable solvent such as water or chloroform and applied to any layer support, with or without binder. Application of the substances is carried out by known methods involving spraying solutions or casting from solutions or suspensions of layer forming natural colloids or synthetic resins. Gelatin, cellulose, cellulose esters, cellulose ethers, polycarbonates, particularly those based on bis-phenylolalkanes, polyesters, especially those based on polyethylene terephthalate, polyamides, polyurethanes and various film-forming polymers or copolymers of olefinically unsaturated monomers such as vinyl chloride, vinyl acetate, styrene, olefinically unsaturated carboxylic acids, their esters or other derivatives such as maleic acid anhydride, acrylic acid or methacrylic acid or their derivatives are suitable for this purpose.

The layers are rendered sensitive to light by heating them briefly (about 1 to 2 minutes) to a temperature of at least 80° C., preferably a temperature of between 80° C. and 100° C.

The light used for imagewise exposure contains advantageously light from the UV-range of the spectrum, such as daylight or sunlight, or mercury vapour lamps and the like.

According to another suitable method, the layers which are not sensitive to light are heated by imagewise treatment with infra-red radiation to convert them imagewise into lightsensitive cyclic aryl polyimides. This image can be rendered visible by uniform exposure to UV light. This variation of the process is advantageous in that the images obtained are immediately stable to light and do not require any further stabilization.

The compounds for use according to the invention may also be used in self supporting layers. The layer-forming binding agents mentioned above are also suitable here. The choice of binder is in principle not critical and can easily be made from the wide variety of natural and synthetic hydrophilic and hydrophobic layer binding agents by the usual tests.

When using the first of the processing methods described above, it is necessary to stabilize the photographic images by rendering the cyclic aryl polyamides insensitive to light in the unexposed areas of the layer. This can be achieved e.g. by the action of reagents which react with unsaturated double bonds or which react e.g. with a ring opening action on cyclopropane rings. Examples of reagents which react with unsaturated double bonds are halogens such as bromine, chlorine, or iodine, hydrohalic acids such as hydrogen chloride or hydrogen bromide, ozone, peroxy acids or hydrogen, sulfonyl chlorides or sulfur dichloride and potassium permanganate. Another method of converting the light-sensitive cyclic polyimides into compounds which are insensitive to light consists in opening the cyclic imide group, e.g. by hydrolysis into polyamido carboxylic acid or by aminolysis into polyamides. Stabilization may also be achieved by selectively dissolving out the light-senstive polyimides with suitable solvents.

The images may, of course, also be stabilized by the dry process described in German patent specification No. P 19 55 751.8. In this case, stabilization is achieved by heating and diffusion after exposure. Reversal images and offset printing forms which are stable in daylight are obtained.

EXAMPLE 1

1 g. of compound B1 and 2 g. of compound A1 are dissolved in 50 ml. of chloroform. 25 ml. of a 20% solution of polyvinyl acetate in chloroform are added to this solution. The solution is applied onto a baryta-coated paper support and dried.

The layers are not sensitive to light and can be converted into the light-sensitive cyclic naphthylene polycarboxylic polyimide by heat treatment.

Processing.—The layers are heated to about 80° C. for about 90 seconds. They are then exposed to a mercury lamp ("Osram HQA," 400 w.) through a continuous tone original. A dark colored image of the original with excellent reproduction of the continuous tones is obtained.

EXAMPLE 2

1 g. of compound B2 and 2 g. of compound A7 are dissolved in 50 ml. of chloroform. 25 ml. of a 20% solution of polyvinyl acetate in chloroform are added to this solution. It is applied onto a baryta-coated paper support and dried.

The layers are not sensitive to light but are rendered light-sensitive imagewise by imagewise exposure to infra-red light.

Processing.—The layers are heated imagewise to about 80° C. by imagewise exposure to infra-red light for about 90 seconds. They are then uniformly exposed to a mercury lamp ("Osram HQA," 400 watt). A dark colored image of the original is obtained.

We claim:
1. A sheetlike photographic element containing a light-insensitive arylene polyamidopolycarboxylic acid of the formula:

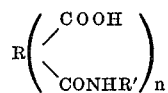

in which
R is a 2 n-valent mononuclear or polynuclear condensed aromatic radical;
R′ represents
(I) an olefinically unsaturated linear aliphatic radical,
(II) an olefinically unsaturated cyclic aliphatic radical which is connected to nitrogen either directly or through an alkylene bridge, or
(III) a 5- or 6-membered ring which contains a cyclopropane group, and
$n$ stands for 2 or 3
and in addition containing an isourea derivative of the formula:

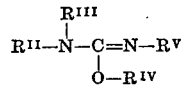

in which
$R^{II}$ is alkyl, cycloalkyl or aryl;
$R^{III}$ is hydrogen or $R^{II}$;
$R^{IV}$ is alkyl with up to 5 carbon atoms and
$R^{V}$ is $R^{II}$.

References Cited

UNITED STATES PATENTS 3,533,798  10/1970  Muller et al. ---------- 96—90

RONALD H. SMITH, Primary Examiner

U.S. Cl. X.R.

96—48 R; 250—65 T